(12) United States Patent
Han et al.

(10) Patent No.: US 8,610,553 B2
(45) Date of Patent: Dec. 17, 2013

(54) TIRE PRESSURE MONITORING SYSTEM

(75) Inventors: Won Han, Gyunggi-do (KR); Jong Hyeong Song, Gyunggi-do (KR); Kyung No Lee, Seoul (KR); Hae Seung Hyun, Gyunggi-do (KR); Jong Woo Han, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 94 days.

(21) Appl. No.: 13/424,452

(22) Filed: Mar. 20, 2012

(65) Prior Publication Data

US 2013/0169427 A1 Jul. 4, 2013

(30) Foreign Application Priority Data

Dec. 29, 2011 (KR) .......................... 10-2011-0146329

(51) Int. Cl.
*B60C 23/00* (2006.01)
*H01Q 1/32* (2006.01)

(52) U.S. Cl.
USPC .......... 340/447; 340/442; 340/445; 73/146.5; 73/146.8; 343/711; 152/450; 116/34 R

(58) Field of Classification Search
USPC ........................... 340/447; 73/146.5; 343/711
See application file for complete search history.

(56) References Cited

U.S. PATENT DOCUMENTS

| | | | |
|---|---|---|---|
| 5,987,980 A * | 11/1999 | Mangafas et al. | 73/146.8 |
| 6,799,455 B1 * | 10/2004 | Neefeldt et al. | 73/146 |
| 7,916,011 B2 * | 3/2011 | Marguet et al. | 340/447 |
| 2010/0326180 A1 | 12/2010 | Nagora et al. | |

FOREIGN PATENT DOCUMENTS

JP 2007-083905 A 4/2007
KR 10-2011-0099043 A 9/2011

OTHER PUBLICATIONS

Office action dated May 20, 2013 from corresponding Korean Patent Application No. 10-2011-0146329 and its English summary provided by the clients.

* cited by examiner

*Primary Examiner* — Donnie Crosland
(74) *Attorney, Agent, or Firm* — Ladas & Parry, LLP

(57) ABSTRACT

Disclosed herein is a tire pressure monitoring system, including an electrical device unit including a pressure sensor for detecting an air pressure of a tire; a housing that is accommodated in the electrical device unit and into which the air pressure of the tire is introduced; a valve antenna having one end that is inserted into the housing and the other end into which the air pressure of the tire is introduced; a conduction member having one end that is electrically connected to the electrical device unit and the other end that is electrically connected to the valve antenna; and a coupling member fixing and coupling the housing and the valve antenna to each other, wherein the valve antenna transmits a pressure signal about the air pressure of the tire, which is detected by the pressure sensor, to a receiver of a vehicle.

24 Claims, 15 Drawing Sheets

TIRE PRESSURE MONITORING SYSTEM

CROSS REFERENCE TO RELATED APPLICATION

This application claims the benefit of Korean Patent Application No. 10-2011-0146329, filed on Dec. 29, 2011, entitled "Tire Pressure Monitoring System", which is hereby incorporated by reference in its entirety into this application.

BACKGROUND OF THE INVENTION

1. Technical Field

The present invention relates to a tire pressure monitoring system.

2. Description of the Related Art

When a tire pressure of a vehicle is reduced from an appropriate pressure, problems arise in terms of low fuel-efficiency and safety of a driver due to tire wear. Thus, recently, a tire pressure monitoring system (TPMS) for notifying a driver about the reduction in tire pressure in real time has been used.

A TPMS is installed on a tire wheel and wirelessly transmits input information about an internal region of a tire to an electronic control unit (ECU) so as to notify a driver who rides a car about the input information in real time.

In general, a TPMS includes a housing and a valve antenna. In detail, the housing includes an electrical device unit including a pressure sensor and a battery, and a through pin for transmitting a signal to an antenna.

However, since a TPMS is installed on a tire wheel, a strong centrifugal force and external shocks are excessively applied to the TPMS during a drive of a vehicle.

In addition, a weight of a TPMS needs to be minimized in order to prevent the weight of the TPMS from affecting driving performance of a vehicle.

SUMMARY OF THE INVENTION

The present invention has been made in an effort to provide a tire pressure monitoring system that has high durability against strong centrifugal force and external shocks during a drive of the vehicle and simultaneously has a minimum weight.

According to a first preferred embodiment of the present invention, there is provided a tire pressure monitoring system, including: an electrical device unit including a pressure sensor for detecting an air pressure of a tire; a housing that is accommodated in the electrical device unit and into which the air pressure of the tire is introduced; a valve antenna having one end that is inserted into the housing and the other end into which the air pressure of the tire is introduced; a conduction member having one end that is electrically connected to the electrical device unit and the other end that is electrically connected to the valve antenna; and a coupling member fixing and coupling the housing and the valve antenna to each other, wherein the valve antenna transmits a pressure signal about the air pressure of the tire, which is detected by the pressure sensor, to a receiver of a vehicle.

The conduction member may be formed of a metal material that has elasticity so as to have a repulsive force against a compressive force exerted on the valve antenna.

The conduction member may transmit the electrical signal of the electrical device unit to the valve antenna.

The tire pressure monitoring system may further include a battery unit that is coupled to the electrical device unit and supplies power to the electrical device unit.

The valve antenna may include: a contact portion to which the conduction member is electrically connected; a coupling groove having the coupling member penetrating therethrough; and a valve air path that is formed in the valve antenna, having a predetermined interval from the coupling groove, to introduce the air pressure of the tire into the hosing.

The housing may include a coupling groove formed to face the coupling groove of the valve antenna, and the coupling member may be coupled to the coupling grooves of the valve antenna and the housing so as to penetrate therethrough, thereby fixing and coupling the valve antenna and the housing to each other The valve antenna may include a contact portion to which the conduction member is electrically connected; a protrusion portion protruding from the contact portion toward the housing; and a coupling groove having the coupling member penetrating therethrough.

The valve antenna may further include a valve air path that is formed in the valve antenna, having a predetermined interval from the coupling groove, to introduce the air pressure of the tire into the hosing.

The housing may include an accommodation groove formed in the housing so as to accommodate the protrusion portion of the valve antenna therein; and a coupling groove formed to face the coupling groove of the valve antenna, wherein the coupling member may be coupled to the coupling grooves of the valve antenna and the housing so as to penetrate therethrough, thereby fixing and coupling the valve antenna and the housing to each other.

The conduction member may have the other end be divided into two portions so that the protrusion portion penetrates therethrough, and be electrically connected to the contact portion.

The conduction member may include an elastic piece that is formed between one end that is electrically connected to the electrical device unit and the other end that is electrically connected to the valve antenna.

The protrusion portion may have a circular cross section.

The protrusion portion may have a semicircular cross section.

The protrusion portion may have a square cross section.

The valve antenna may include a contact portion to which the conduction member is electrically connected; a protrusion portion protruding from the contact portion toward the housing; and a valve air path formed in the valve antenna so as to introduce the air pressure of the tire into the housing, wherein the protrusion portion has an outer circumference surface on which screw threads are formed and has a circular cross section.

The housing may include an accommodation groove accommodating the protrusion portion of the valve antenna therein, and the accommodation groove may have an inner circumference surface on which screw threads are formed such that the screw thread are coupled with the protrusion portion.

One end of the valve air path may have an opening that is formed outside an outer circumference surface of the valve antenna and the other end of the valve air path is shaped like a hollow hole having an opening formed in an end portion of the valve antenna.

The valve air path may have a "L." shaped cross section.

The valve antenna may include a contact portion to which the conduction member is electrically connected; a protrusion portion protruding from the contact portion toward the housing; a valve air path shaped like a hollow hole having an opening that is formed in an upper portion of the protrusion portion so as to introduce the air pressure of the tire into the housing; and a pair of coupling grooves formed from an outer circumference surface of the valve antenna to an inner portion.

The housing may include an accommodation groove accommodating the protrusion portion of the valve antenna therein; a coupling groove formed to face the coupling groove of the valve antenna; and a housing air path connected to the opening of the valve air path so as to introduce the air pressure of the tire into the housing, wherein the coupling member has the coupling groove penetrating therethrough so as to fix and couple the valve antenna and the housing to each other.

The valve antenna may include a contact portion to which the conduction member is electrically connected; a protrusion portion protruding from the contact portion toward the housing; a coupling groove that is formed in an end portion of the protrusion portion and has the coupling member penetrating therethrough; and a valve air path that is formed in the valve antenna, having a predetermined interval from the coupling groove, to introduce the air pressure of the tire into the housing.

The housing may include a through hole that has an opening formed in an end portion of the housing so as to accommodate the protrusion portion of the valve antenna therein and to expose a portion of the protrusion portion to the outside of the housing.

The conduction member may have the other end divided into two portions so that the protrusion portion penetrates therethrough, and is electrically connected to the contact portion.

The protrusion portion may have a coupling groove formed in an end portion having the through hole of the housing penetrating therethrough and is exposed to the outside, and the coupling member may the coupling groove penetrating therethrough so as to fix and couple the valve antenna and the housing to each other.

DESCRIPTION OF THE PREFERRED EMBODIMENTS

Figure 1:
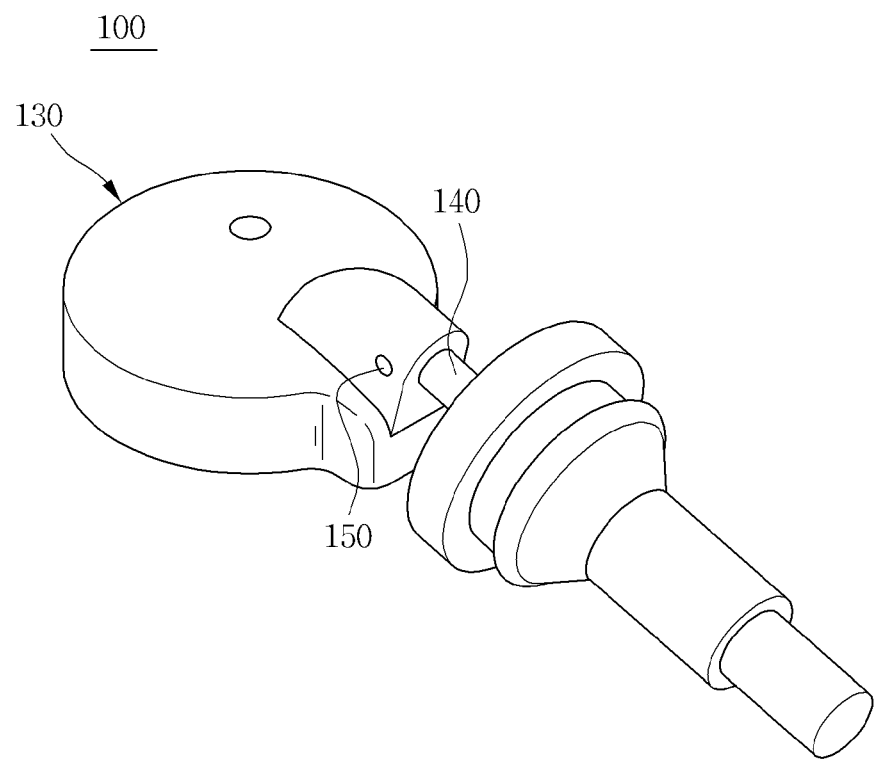
FIG. 1 is a schematic structural diagram of a tire pressure monitoring system according to an embodiment of the present invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. The terms such as "first" and "second" are used herein merely to describe a variety of constituent elements, but the constituent elements are not limited by the terms. The terms are used only for the purpose of distinguishing one constituent element from another constituent element. Further, when it is determined that the detailed description of the known art related to the present invention may obscure the gist of the present invention, the detailed description thereof will be omitted.

Hereinafter, the preferred embodiments of the present invention will be described in detail with reference to the accompanying drawings.

First Embodiment

Figure 2:
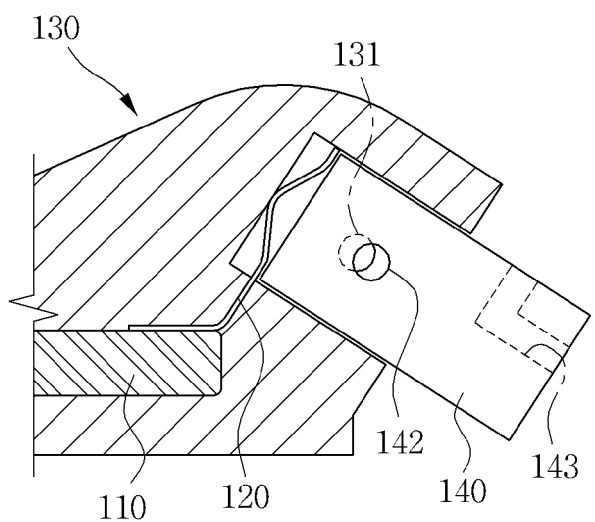
FIG. 2 is a side view of a case before the tire pressure monitoring system of FIG. 1 is assembled, according to a first embodiment of the present invention.
Figure 3:
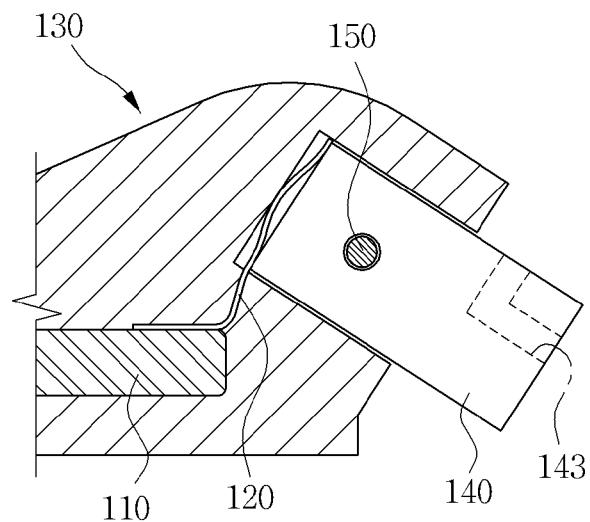
FIG. 3 is a side view of a case after the tire pressure monitoring system of FIG. 1 is assembled, according to the first embodiment of the present invention.
Figure 4:
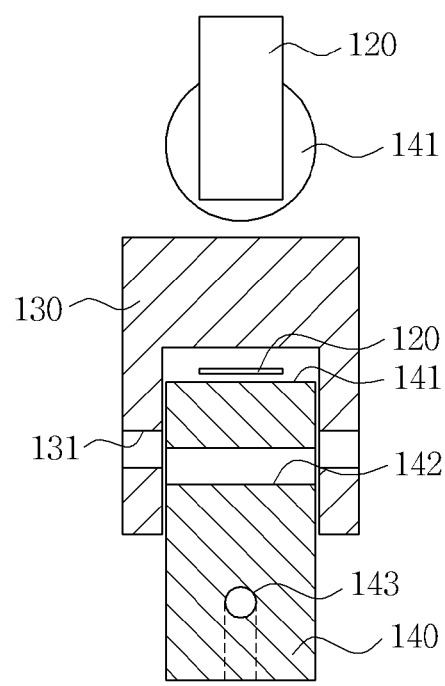
FIG. 4 is a front view of a case before the tire pressure monitoring system of FIG. 1 is assembled, according to the first embodiment of the present invention.
Figure 5:
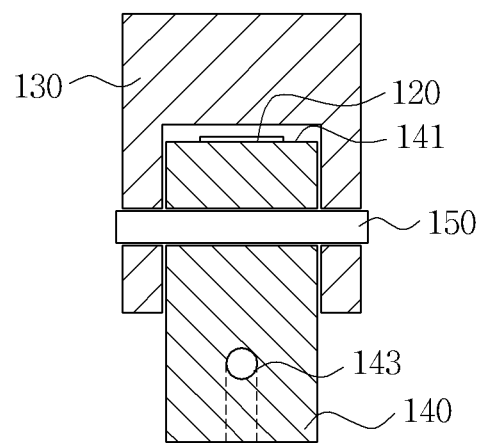
FIG. 5 is a front view of a case after the tire pressure monitoring system of FIG. 1 is assembled, according to the first embodiment of the present invention.

FIG. 1 is a schematic structural diagram of a tire pressure monitoring system 100 according to an embodiment of the present invention. FIG. 2 is a side view of a case before the tire pressure monitoring system 100 of FIG. 1 is assembled, according to a first embodiment of the present invention. FIG. 3 is a side view of a case after the tire pressure monitoring system 100 of FIG. 1 is assembled, according to the first embodiment of the present invention. FIG. 4 is a front view of a case before the tire pressure monitoring system 100 of FIG. 1 is assembled, according to the first embodiment of the present invention. FIG. 5 is a front view of a case after the tire pressure monitoring system 100 of FIG. 1 is assembled, according to the first embodiment of the present invention.

As shown in FIGS. 1 through 5, the tire pressure monitoring system 100 includes an electrical device unit 110, a conduction member 120, a housing 130, a valve antenna 140, and a coupling member 150.

The tire pressure monitoring system 100 according to the present embodiment further includes a battery unit that is coupled to the electrical device unit 110 and supplies power to the electrical device unit 110.

In addition, the electrical device unit 110 includes a pressure sensor for detecting an air pressure of a tire.

One end of the conduction member 120 is electrically connected to the electrical device unit 110. The other end of the conduction member 120 is electrically connected to the valve antenna 140 that will be described below.

Accordingly, the conduction member 120 transmits an electrical signal of the pressure sensor included in the electrical device unit 110 to the valve antenna 140.

In addition, the conduction member 120 may be formed of a metal material that has elasticity so as to have a repulsive force against a compressive force exerted on the valve antenna 140.

That is, as shown in FIGS. 2 and 4, before the valve antenna 140 inserted into and fixed to the housing 130 by the coupling member 150 that will be described below, the other end of the conduction member 120 does not contact the valve antenna 140.

Then, as shown in FIGS. 3 and 5, when the valve antenna 140 is inserted into and fixed to the housing 130 by the coupling member 150, the conduction member 120 having elasticity contacts the valve antenna 140.

Thus, the conduction member 120 transmits the electrical signal of the electrical device unit 110 to the valve antenna 140.

The housing 130 accommodates the electrical device unit 110 therein. The air pressure of the tire is introduced into the housing 130 through the valve antenna 140.

In addition, the housing 130 includes a coupling groove 131 that is formed to face a coupling groove 142 of the valve antenna 140 that will be described below.

One end of the valve antenna 140 is inserted into the housing 130. The air pressure of the air is introduced from the other end of the valve antenna 140.

In addition, the valve antenna 140 transmits a pressure signal that is an electrical signal about the air pressure of the tire, which is detected by the pressure sensor, to a receiver of a vehicle.

In more detail, the valve antenna 140 includes a contact portion 141, the coupling groove 142, and a valve air path 143.

The contact portion 141 may be a portion to which the conduction member 120 is electrically connected and may have a circular cross section, as shown in FIG. 4.

The coupling groove 142 is formed in a perpendicular direction to a direction in which the valve antenna 140 is inserted into and fixed to the housing 130. Thus, the coupling member 150 has the coupling groove 142 penetrating therethrough.

The valve air path 143 introduces the air pressure of the tire into the housing 130 and allows the pressure sensor of the electrical device unit 110 to detect the air pressure of the tire.

In more detail, the valve air path 143 is formed in the valve antenna 140, having a predetermined interval from the coupling groove 142 of the valve antenna 140.

One end of the valve air path 143 has an opening that is formed outside an outer circumference surface of the valve antenna 140.

In addition, the other end of the valve air path 143 has an opening that is formed outside an end portion of the valve antenna 140 and thus may be shaped like a hollow hole.

Thus, the valve air path 143 according to the present embodiment may have a "⌐" shaped cross section.

The coupling member 150 fixes and couples the housing 130 and the valve antenna 140 to each other.

In more detail, the coupling member 150 is coupled to the coupling groove 131 of the housing 130 and the coupling groove 142 of the valve antenna 140.

That is, as shown in FIG. 5, the housing 130 and the valve antenna 140 are coupled and fixed to each other by the coupling member 150.

Thus, the tire pressure monitoring system 100 according to the present embodiment provides high durability to a vehicle by using stable adhesion without electrical short circuits in spite of strong centrifugal force and external shocks during a drive of the vehicle.

Second Embodiment

Figure 6:
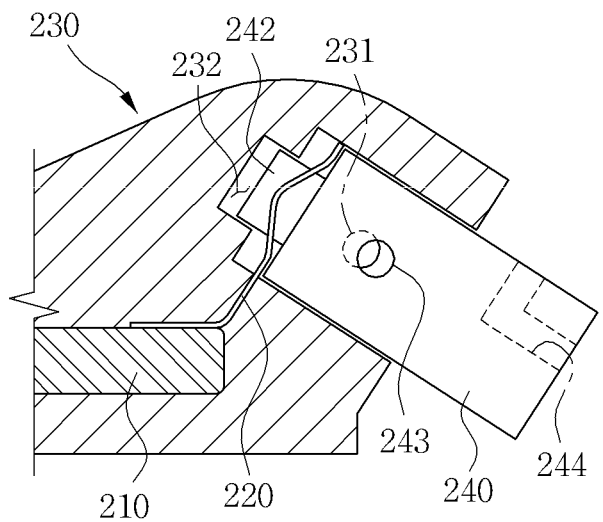
FIG. 6 is a side view of a case before a tire pressure monitoring system is assembled, according to a second embodiment of the present invention.
Figure 7:
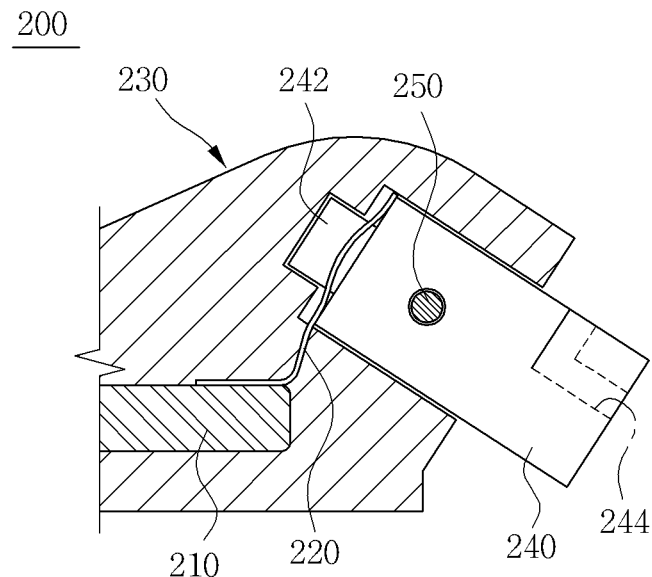
FIG. 7 is a side view of a case after the tire pressure monitoring system of FIG. 6 is assembled, according to the second embodiment of the present invention.
Figure 8:
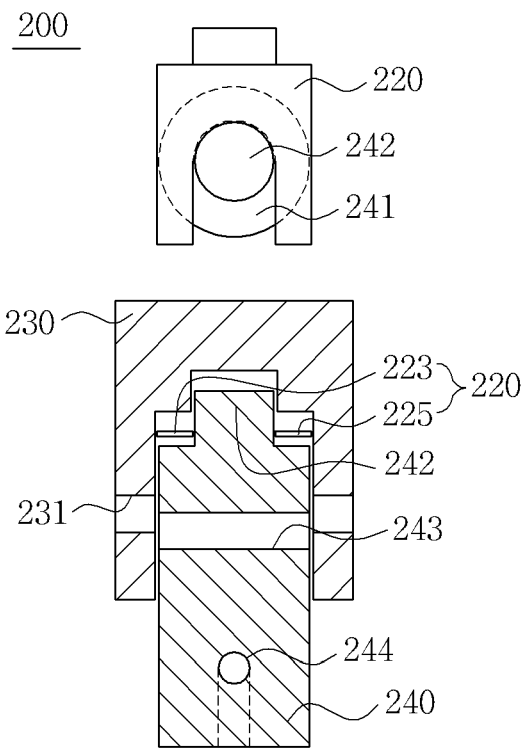
FIG. 8 is a front view of a case before the tire pressure monitoring system of FIG. 6 is assembled, according to the second embodiment of the present invention.
Figure 9:
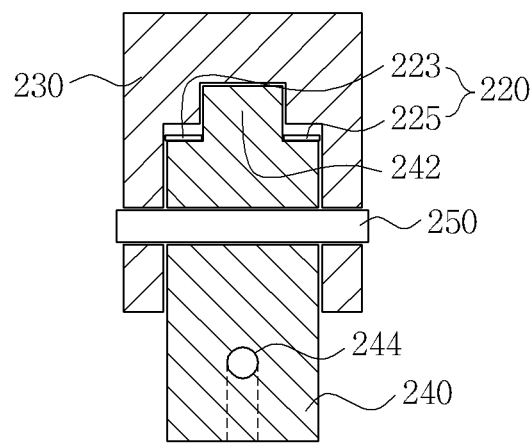
FIG. 9 is a front view of a case after the tire pressure monitoring system of FIG. 6 is assembled, according to the second embodiment of the present invention.

FIG. 6 is a side view of a case before a tire pressure monitoring system 200 is assembled, according to a second embodiment of the present invention. FIG. 7 is a side view of a case after the tire pressure monitoring system 200 is assembled, according to the second embodiment of the present invention. FIG. 8 is a front view of a case before the tire pressure monitoring system 200 is assembled, according to the second embodiment of the present invention. FIG. 9 is a front view of a case after the tire pressure monitoring system 200 is assembled, according to the second embodiment of the present invention. With regard to the tire pressure monitoring system 200, the same or corresponding elements as in the above-described embodiment of the present invention will not be repeated. Hereinafter, the tire pressure monitoring system 200 will be described with reference to FIGS. 6 through 9.

As shown in FIGS. 6 through 9, the tire pressure monitoring system 200 includes an electrical device unit 210, a conduction member 220, a housing 230, a valve antenna 240, and a coupling member 250.

The valve antenna 240 includes a contact portion 241, a protrusion portion 242, a coupling groove 243, and a valve air path 244.

The contact portion 241 may be a portion to which the conduction member 220 is electrically connected may have a circular cross section, as shown in FIG. 8.

The protrusion portion 242 increases adhesion between the housing 230 and the valve antenna 240 and protrudes from the contact portion 241.

The protrusion portion 242 guides the valve antenna 240 such that a coupling groove 231 of the housing 230 may face the coupling groove 243 of the valve antenna 240 when the housing 230 and the valve antenna 240 are coupled to each other.

The coupling groove 243 is formed in a perpendicular direction to a direction in which the valve antenna 240 is inserted into the housing 230. In addition, the coupling member 250 has the coupling groove 243 penetrating therethrough.

The valve air path 244 introduces an air pressure of a tire into the housing 230 and allows a pressure sensor of the electrical device unit 210 to detect the air pressure of the tire.

The housing 230 includes the coupling groove 231 and an accommodation groove 232. In more detail, the coupling groove 231 may be formed so as to face the coupling groove 243 of the valve antenna 240.

Thus, as shown in FIGS. 7 and 9, the coupling member 250 has the coupling groove 231 of the housing 230 and the coupling groove 243 of the valve antenna 240, penetrating therethrough, so as to fix and couple the housing 230 and the valve antenna 240 to each other.

In addition, the accommodation groove 232 accommodates the protrusion portion 242 of the valve antenna 240 therein and is formed in the housing 230.

As shown in FIGS. 8 and 9, the conduction member 220 has the other end thereof divided into two portions 223 and 225 so that the protrusion portion 242 penetrates therethrough, and is electrically connected to the contact portion 241.

Third Embodiment

Figure 10:
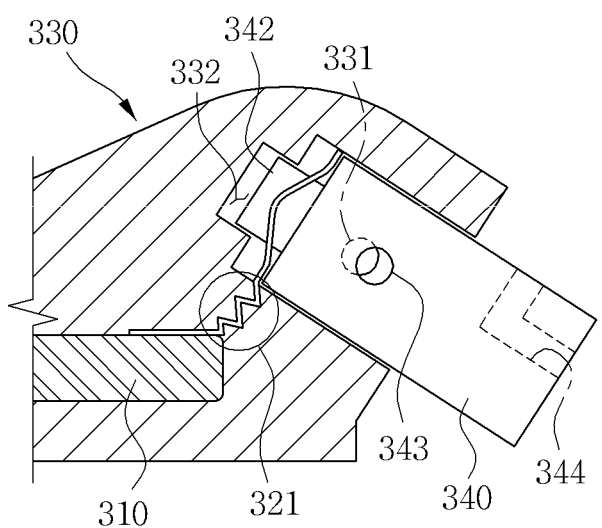
FIG. 10 is a side view of a case before a tire pressure monitoring system is assembled, according to a third embodiment of the present invention.
Figure 11:
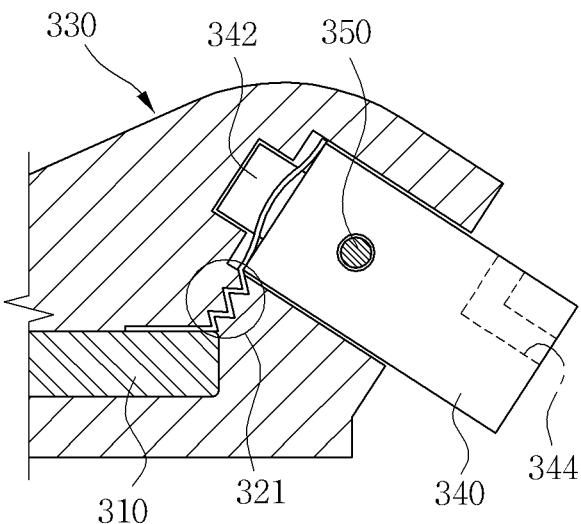
FIG. 11 is a side view of a case after the tire pressure monitoring system of FIG. 10 is assembled, according to the third embodiment of the present invention.
Figure 12:
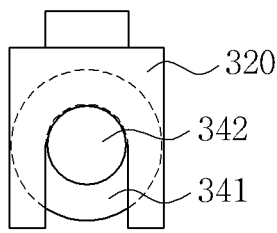
FIG. 12 is a front view of a case before the tire pressure monitoring system of FIG. 10 is assembled, according to the third embodiment of the present invention.
Figure 12:
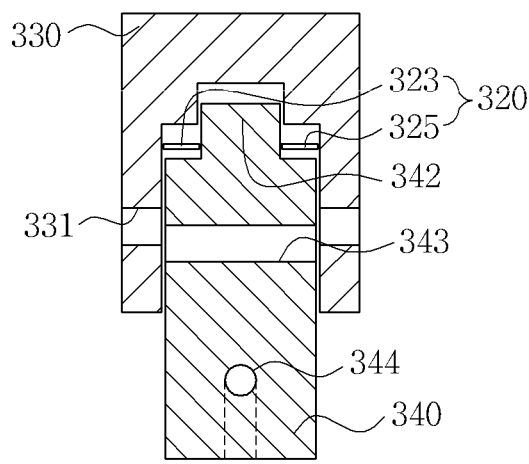
Figure 13:
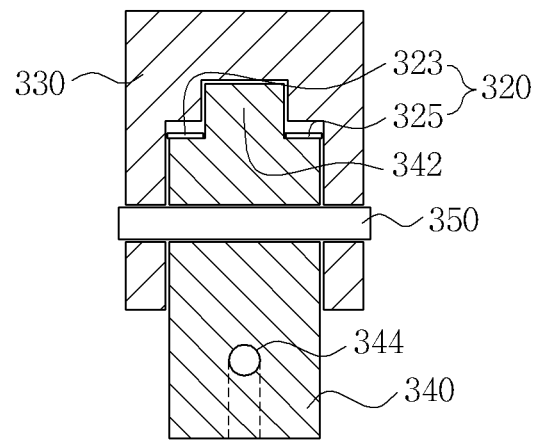
FIG. 13 is a front view of a case after the tire pressure monitoring system of FIG. 10 is assembled, according to the third embodiment of the present invention.

FIG. 10 is a side view of a case before a tire pressure monitoring system 300 is assembled, according to a third embodiment of the present invention. FIG. 11 is a side view of a case after the tire pressure monitoring system 300 is assembled, according to the third embodiment of the present invention. FIG. 12 is a front view of a case before the tire pressure monitoring system 300 is assembled, according to the third embodiment of the present invention. FIG. 13 is a front view of a case after the tire pressure monitoring system 300 is assembled, according to the third embodiment of the present invention. With regard to the tire pressure monitoring system 300, the same or corresponding elements as in the above-described embodiments of the present invention will not be repeated. Hereinafter, the tire pressure monitoring system 300 will be described with reference to FIGS. 10 through 13.

As shown in FIGS. 10 through 13, the tire pressure monitoring system 300 includes an electrical device unit 310, a conduction member 320, a housing 330, a valve antenna 340, and a coupling member 350.

As shown in FIGS. 10 and 11, the conduction member 320 includes an elastic piece 321 that is formed between one end that is electrically connected to the electrical device unit 310 and the other end that is electrically connected to the valve antenna 340.

Accordingly, the conduction member 320 may electrically stably contact the valve antenna 340 by increasing a repulsive force against a compressive force exerted on the valve antenna 340.

In more detail, the conduction member 320 has additional elasticity in a longitudinal direction by the elastic piece 321, and thus a vehicle may maintain a stable state although the vehicle is deformed in the longitudinal direction due to strong centrifugal force and external shocks during a drive of the vehicle.

Fourth Embodiment

Figure 14:
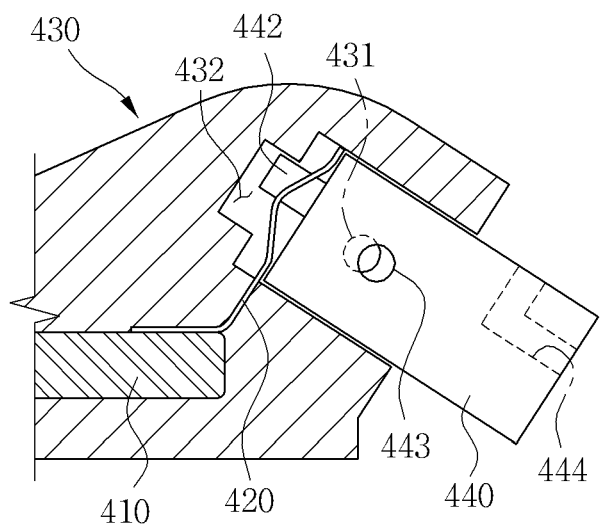
FIG. 14 is a side view of a case before a tire pressure monitoring system is assembled, according to a fourth embodiment of the present invention.
Figure 15:
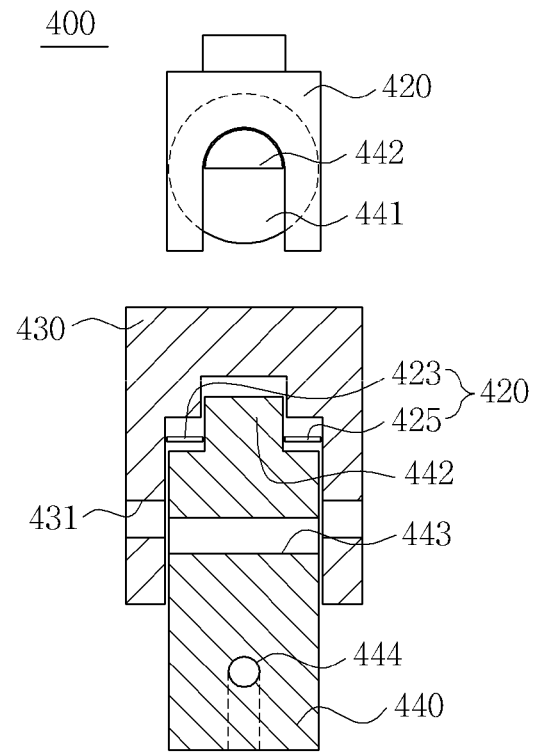
FIG. 15 is a front view of a case before the tire pressure monitoring system of FIG. 14 is assembled, according to the fourth embodiment of the present invention.

FIG. 14 is a side view of a case before a tire pressure monitoring system 400 is assembled, according to a fourth embodiment of the present invention. FIG. 15 is a front view of a case before the tire pressure monitoring system 400 is assembled, according to the fourth embodiment of the present invention. With regard to the tire pressure monitoring system 400, the same or corresponding elements as in the above-described embodiments of the present invention will not be repeated. Hereinafter, the tire pressure monitoring system 400 will be described with reference to FIGS. 14 and 15.

As shown in FIGS. 14 and 15, the tire pressure monitoring system 400 includes an electrical device unit 410, a conduction member 420, a housing 430, a valve antenna 440, and a coupling member 450.

As shown in FIG. 15, a protrusion portion 442 included in the valve antenna 440 according to the present embodiment may have a semicircular cross section.

Thus, the protrusion portion 442 guides the valve antenna 440 such that a coupling groove 431 of the housing 430 may face a coupling groove 443 of the valve antenna 440 when the housing 430 and the valve antenna 440 are coupled to each other.

Fifth Embodiment

Figure 16:
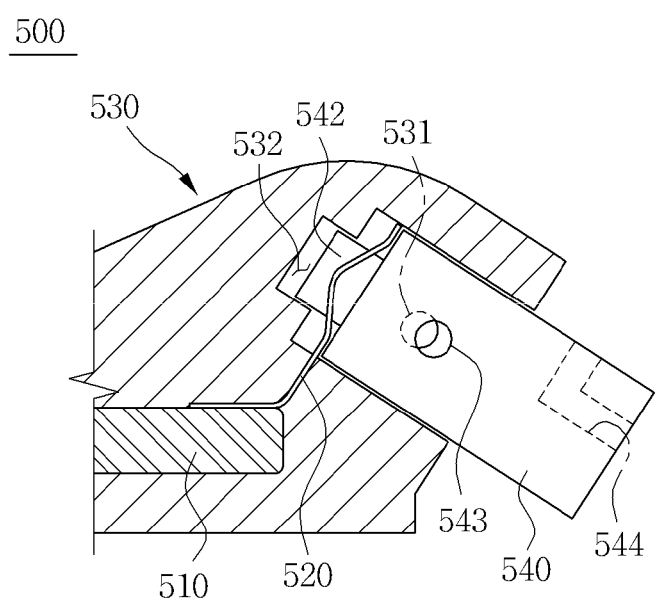
FIG. 16 is a side view of a case before a tire pressure monitoring system is assembled, according to a fifth embodiment of the present invention.
Figure 17:
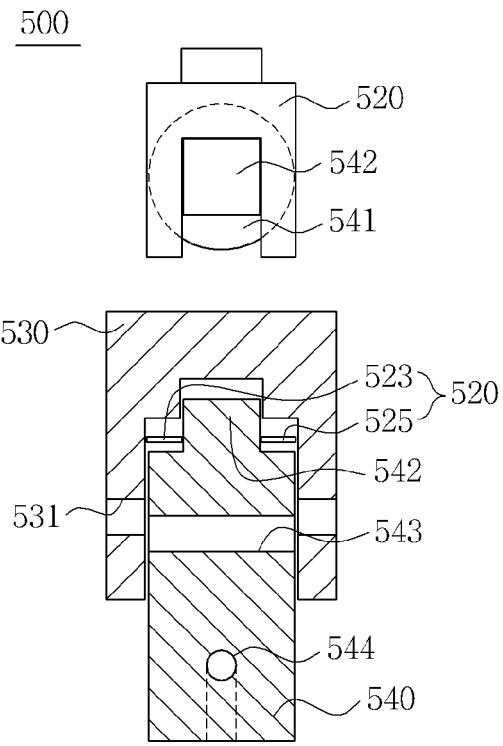
FIG. 17 is a front view of a case before the tire pressure monitoring system of FIG. 16 is assembled, according to the fifth embodiment of the present invention.

FIG. 16 is a side view of a case before a tire pressure monitoring system 500 is assembled, according to a fifth embodiment of the present invention. FIG. 17 is a front view of a case before the tire pressure monitoring system 500 is assembled, according to the fifth embodiment of the present invention. With regard to the tire pressure monitoring system 500, the same or corresponding elements as in the above-described embodiments of the present invention will not be repeated. Hereinafter, the tire pressure monitoring system 500 will be described with reference to FIGS. 16 and 17.

As shown in FIGS. 16 and 17, the tire pressure monitoring system 500 includes an electrical device unit 510, a conduction member 520, a housing 530, a valve antenna 540, and a coupling member 550.

As shown in FIG. 17, a protrusion portion 542 included in the valve antenna 540 according to the present embodiment may have a square cross section.

Thus, the protrusion portion 542 guides the valve antenna 540 such that a coupling groove 531 of the housing 530 may face a coupling groove 543 of the valve antenna 540 when the housing 530 and the valve antenna 540 are coupled to each other.

Sixth Embodiment

Figure 18:
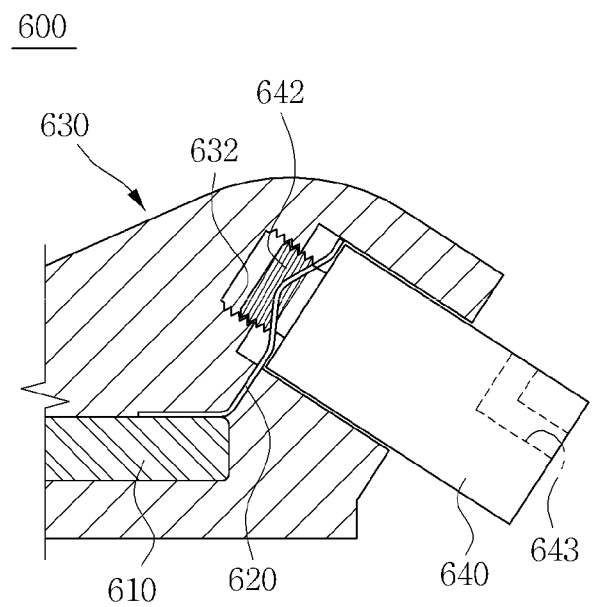
FIG. 18 is a side view of a case before a tire pressure monitoring system is assembled, according to a sixth embodiment of the present invention.
Figure 19:
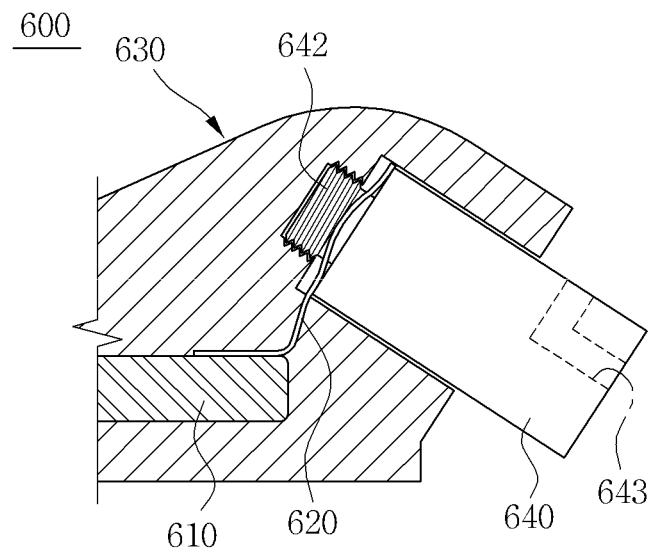
FIG. 19 is a side view of a case after the tire pressure monitoring system of FIG. 18 is assembled, according to the sixth embodiment of the present invention.
Figure 20:
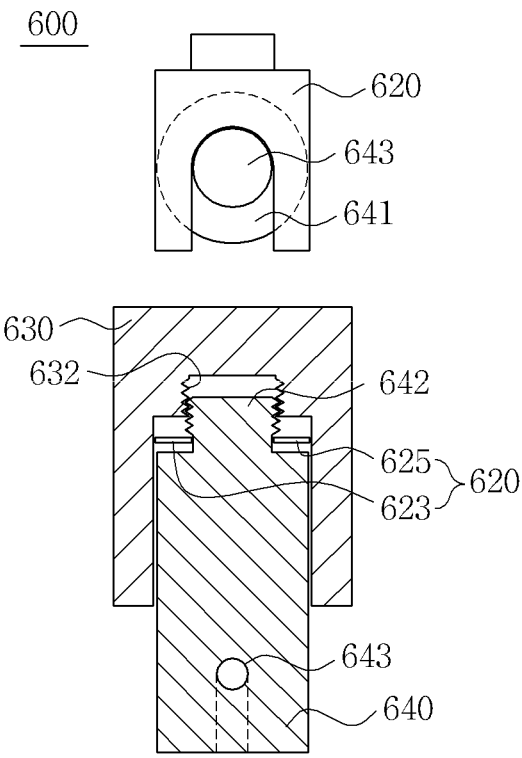
FIG. 20 is a front view of a case before the tire pressure monitoring system of FIG. 18 is assembled, according to the sixth embodiment of the present invention.
Figure 21:
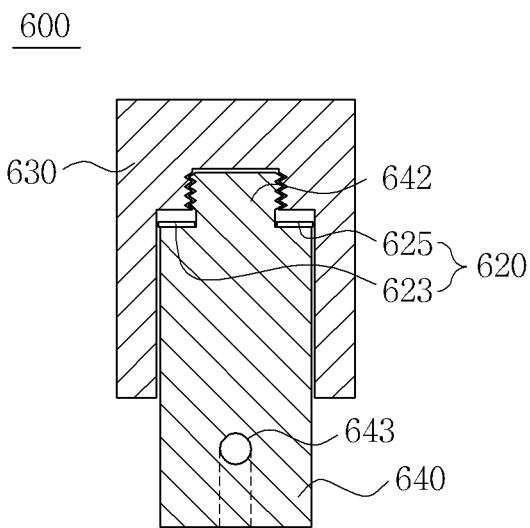
FIG. 21 is a front view of a case after the tire pressure monitoring system of FIG. 18 is assembled, according to the sixth embodiment of the present invention.

FIG. 18 is a side view of a case before a tire pressure monitoring system 600 is assembled, according to a sixth embodiment of the present invention. FIG. 19 is a side view of a case after the tire pressure monitoring system 600 is assembled, according to the sixth embodiment of the present invention. FIG. 20 is a front view of a case before the tire pressure monitoring system 600 is assembled, according to the sixth embodiment of the present invention. FIG. 21 is a front view of a case after the tire pressure monitoring system 600 is assembled, according to the sixth embodiment of the present invention. With regard to the tire pressure monitoring system 600, the same or corresponding elements as in the above-described embodiment of the present invention will not be repeated. Hereinafter, the tire pressure monitoring system 600 will be described with reference to FIGS. 18 through 21.

As shown in FIGS. 18 through 21, the tire pressure monitoring system 600 includes an electrical device unit 610, a conduction member 620, a housing 630, a valve antenna 640, and a coupling member 650.

As shown in FIGS. 18 through 21, a protrusion portion 642 included in the valve antenna 640 has an outer circumference surface on which screw threads are formed and has a circular cross section.

In addition, the housing 630 includes an accommodation groove 632 for accommodating the protrusion portion 642 of the valve antenna 640 therein.

In addition, screw threads for connection with the protrusion portion 642 are formed on an inner circumference surface of the accommodation groove 632.

Thus, since the housing 630 and the valve antenna 640 are screwed to each other, a strong compressive force is exerted on the conduction member 620 such that the conduction member 620 and the valve antenna 640 may electrically stably contact each other.

In addition, the tire pressure monitoring system 600 according to the present embodiment provides high durability to a vehicle by using stable adhesion without electrical short circuits in spite of strong centrifugal force and external shocks during a drive of the vehicle.

Seventh Embodiment

Figure 22:
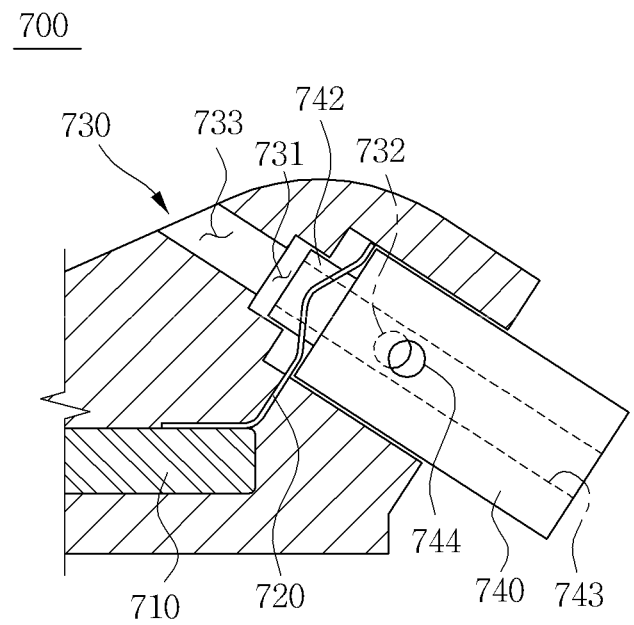
FIG. 22 is a side view of a case before a tire pressure monitoring system is assembled, according to a seventh embodiment of the present invention.
Figure 23:
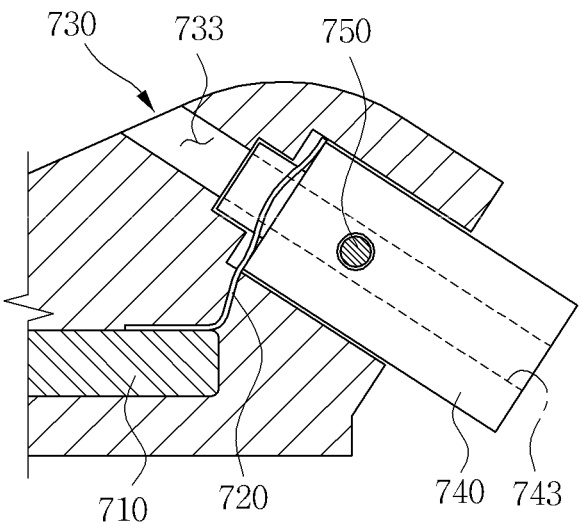
FIG. 23 is a side view of a case after the tire pressure monitoring system of FIG. 22 is assembled, according to the seventh embodiment of the present invention.
Figure 24:
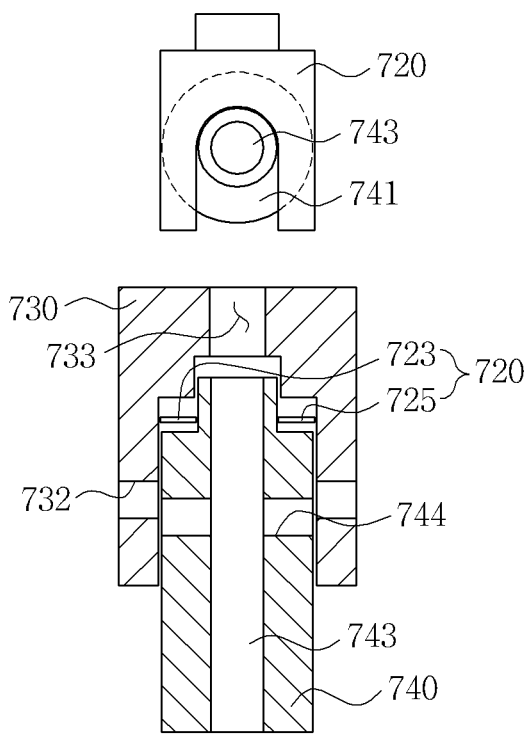
FIG. 24 is a front view of a case before the tire pressure monitoring system of FIG. 22 is assembled, according to the seventh embodiment of the present invention.
Figure 25:
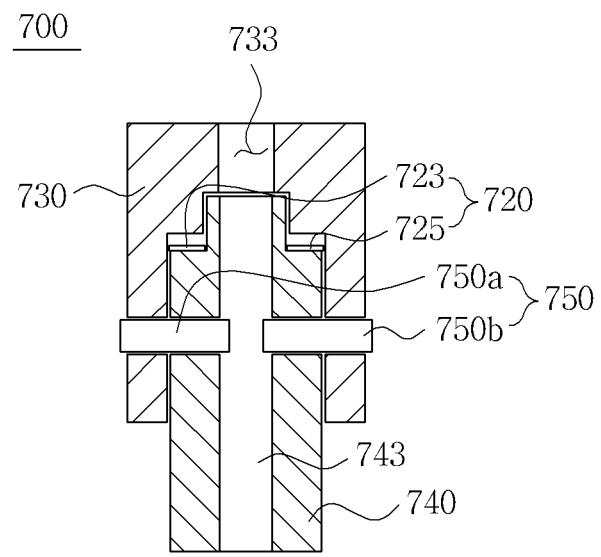
FIG. 25 is a front view of a case after the tire pressure monitoring system of FIG. 22 is assembled, according to the seventh embodiment of the present invention.

FIG. 22 is a side view of a case before a tire pressure monitoring system 700 is assembled, according to a seventh embodiment of the present invention. FIG. 23 is a side view of a case after the tire pressure monitoring system 700 is assembled, according to the seventh embodiment of the present invention. FIG. 24 is a front view of a case before the tire pressure monitoring system 700 is assembled, according to the seventh embodiment of the present invention. FIG. 25 is a front view of a case after the tire pressure monitoring system 700 is assembled, according to the seventh embodiment of the present invention. With regard to the tire pressure monitoring system 700, the same or corresponding elements as in the above-described embodiment of the present invention will not be repeated. Hereinafter, the tire pressure monitoring system 700 will be described with reference to FIGS. 22 through 25.

As shown in FIGS. 22 through 25, the tire pressure monitoring system 700 includes an electrical device unit 710, a conduction member 720, a housing 730, a valve antenna 740, and a coupling member 750.

The housing 730 includes an accommodation groove 731, coupling grooves 732, and a housing air path 733.

The housing air path 733 is connected to an opening of a valve air path 743 that will be described below so as to introduce an air pressure of a tire into the housing 730.

The valve antenna 740 includes a contact portion 741, a protrusion portion 742, the valve air path 743, and coupling grooves 744.

The contact portion 741 is a portion that is electrically connected to the conduction member 720. As shown in FIG. 24, the contact portion 741 may have a circular cross section.

The protrusion portion 742 increases adhesion between the housing 730 and the valve antenna 740 and protrudes from the contact portion 741.

In addition, the protrusion portion 742 guides the valve antenna 740 such that the coupling grooves 732 of the housing 730 may face the coupling grooves 744 of the valve antenna 740 when the housing 730 and the valve antenna 740 are coupled to each other.

The valve air path 743 introduces an air pressure of a tire into the housing 730 and allows a pressure sensor of the electrical device unit 710 to detect the air pressure of the tire.

In more detail, as shown in FIGS. 22 through 25, the valve air path 743 is shaped like a hollow hole that is formed in the valve antenna 740 in order to introduce the air pressure of the tire into the housing 730.

That is, the valve antenna 740 includes the hollow hole that extends from the other end of the valve antenna 740 to an opening formed in an upper portion of the protrusion portion 742.

The coupling grooves 744 are formed in a perpendicular direction to a direction in which the valve antenna 740 is inserted into the housing 730. Thus, the coupling member 750 has the coupling grooves 744 penetrating therethrough.

In more detail, as shown in FIGS. 24 and 25, since the valve air path 743 is formed in the valve antenna 740, the valve antenna 740 includes a pair of grooves that are formed from an outer circumference surface of the valve antenna 740 to an inner portion adjacent to the valve air path 743.

The coupling member 750 may include two coupling members 750a and 750b that are respectively coupled to a pair of coupling grooves 732, which are respectively formed as through holes in two outer circumference surfaces of the housing 730, and a pair of coupling grooves 744, which are respectively formed in two outer circumference surfaces of the valve antenna 740.

Eighth Embodiment

Figure 26:
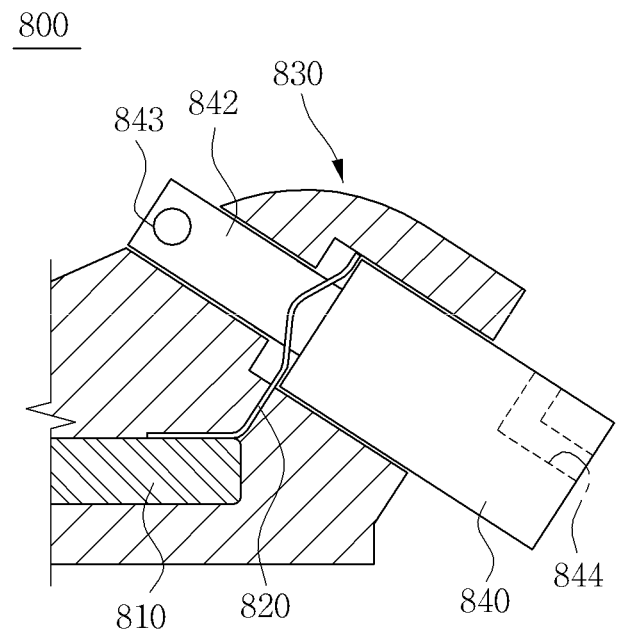
FIG. 26 is a side view of a case before a tire pressure monitoring system is assembled, according to an eighth embodiment of the present invention.
Figure 27:
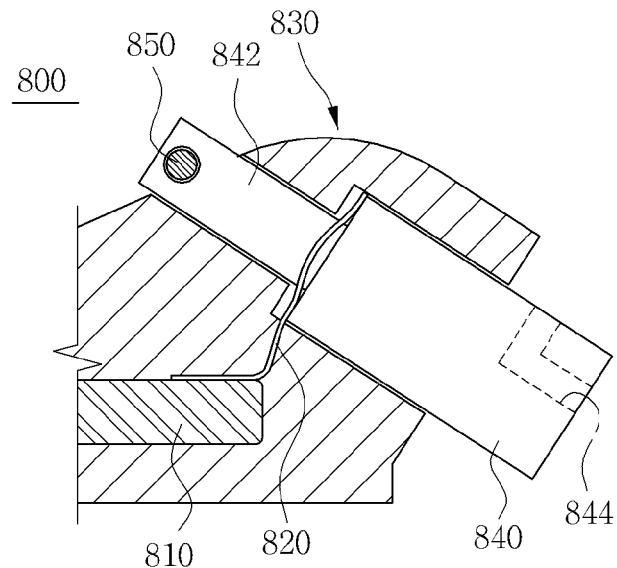
FIG. 27 is a side view of a case after the tire pressure monitoring system of FIG. 26 is assembled, according to the eighth embodiment of the present invention.
Figure 28:
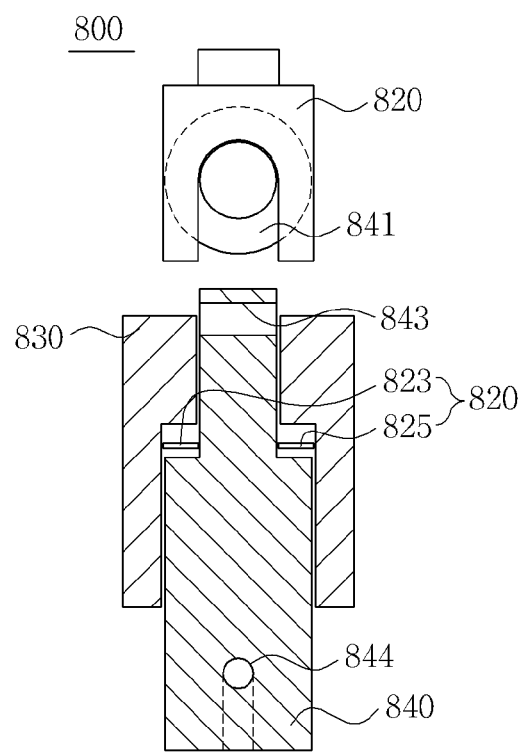
FIG. 28 is a front view of a case before the tire pressure monitoring system of FIG. 26 is assembled, according to the eighth embodiment of the present invention.
Figure 29:
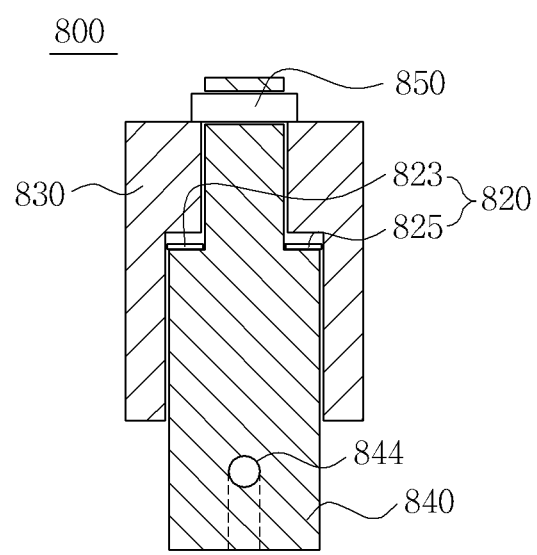
FIG. 29 is a front view of a case after the tire pressure monitoring system of FIG. 26 is assembled, according to the eighth embodiment of the present invention.

FIG. 26 is a side view of a case before a tire pressure monitoring system 800 is assembled, according to an eighth embodiment of the present invention. FIG. 27 is a side view of a case after the tire pressure monitoring system 800 is assembled, according to the eighth embodiment of the present invention. FIG. 28 is a front view of a case before the tire pressure monitoring system 800 is assembled, according to the eighth embodiment of the present invention. FIG. 29 is a front view of a case after the tire pressure monitoring system 800 is assembled, according to the eighth embodiment of the present invention. With regard to the tire pressure monitoring system 800, the same or corresponding elements as in the above-described embodiments of the present invention will not be repeated. Hereinafter, the tire pressure monitoring system 800 will be described with reference to FIGS. 26 through 29.

As shown in FIGS. 26 through 29, the tire pressure monitoring system 800 includes an electrical device unit 810, a conduction member 820, a housing 830, a valve antenna 840, and a coupling member 850.

As shown in FIGS. 26 through 29, the housing 830 includes a through hole that is formed therein and accommodates an entire portion of a protrusion portion 842 of the valve antenna 840 that will be described below.

The through hole of the housing 830 may be formed to have an opening formed in an upper portion of the through hole such that an end portion of the protrusion portion 842 may be exposed to the outside.

The valve antenna 840 includes a contact portion 841, a protrusion portion 842, and a valve air path 844.

A coupling groove 843 is formed in an end portion of the protrusion portion 842 having the through hole of the housing 830 penetrating therethrough and is exposed to the outside.

In addition, the coupling member 850 is coupled to the coupling groove 843 such that the valve antenna 840 may be fixed to the housing 830.

Thus, the conduction member 820 and the valve antenna 840 may be electrically stably connected to each other.

According to the embodiments of the present invention, the tire pressure monitoring system provides high durability to a vehicle by using stable adhesion without electrical short circuits in spite of strong centrifugal force and external shocks during a drive of the vehicle.

In addition, the tire pressure monitoring system may have low manufacturing costs due to a simple assembly structure.

Although the preferred embodiments of the present invention have been disclosed for illustrative purposes, they are for specifically explaining the present invention. Therefore, a tire pressure monitoring system according to the preferred embodiments of the present invention is not limited thereto, but those skilled in the art will appreciate that various modifications and alteration are possible, without departing from the scope and spirit of the invention as disclosed in the accompanying claims.

Accordingly, such modifications and alterations should also be understood to fall within the scope of the present invention. A specific protective scope of the present invention could be defined by accompanying claims.

What is claimed is:

1. A tire pressure monitoring system, comprising:
   an electrical device unit including a pressure sensor for detecting an air pressure of a tire;
   a housing that is accommodated in the electrical device unit and into which the air pressure of the tire is introduced;
   a valve antenna having one end that is inserted into the housing and the other end into which the air pressure of the tire is introduced;
   a conduction member having one end that is electrically connected to the electrical device unit and the other end that is electrically connected to the valve antenna; and
   a coupling member fixing and coupling the housing and the valve antenna to each other,
   wherein the valve antenna transmits a pressure signal about the air pressure of the tire, which is detected by the pressure sensor, to a receiver of a vehicle.

2. The tire pressure monitoring system as set forth in claim 1, wherein the conduction member is formed of a metal material that has elasticity so as to have a repulsive force against a compressive force exerted on the valve antenna.

3. The tire pressure monitoring system as set forth in claim 1, wherein the conduction member transmits the electrical signal of the electrical device unit to the valve antenna.

4. The tire pressure monitoring system as set forth in claim 1, further comprising a battery unit that is coupled to the electrical device unit and supplies power to the electrical device unit.

5. The tire pressure monitoring system as set forth in claim 1, wherein the valve antenna includes:
   a contact portion to which the conduction member is electrically connected;
   a coupling groove having the coupling member penetrating therethrough; and
   a valve air path that is formed in the valve antenna, having a predetermined interval from the coupling groove, to introduce the air pressure of the tire into the hosing.

6. The tire pressure monitoring system as set forth in claim 5, wherein one end of the valve air path has an opening that is formed outside an outer circumference surface of the valve antenna and the other end of the valve air path is shaped like a hollow hole having an opening formed in an end portion of the valve antenna.

7. The tire pressure monitoring system as set forth in claim 5, wherein the housing includes a coupling groove formed to face the coupling groove of the valve antenna, and
   wherein the coupling member is coupled to the coupling grooves of the valve antenna and the housing so as to penetrate therethrough, thereby fixing and coupling the valve antenna and the housing to each other.

8. The tire pressure monitoring system as set forth in claim 1, wherein the valve antenna includes:
   a contact portion to which the conduction member is electrically connected;
   a protrusion portion protruding from the contact portion toward the housing; and
   a coupling groove having the coupling member penetrating therethrough.

9. The tire pressure monitoring system as set forth in claim 8, wherein the valve antenna further includes a valve air path that is formed in the valve antenna, having a predetermined interval from the coupling groove, to introduce the air pressure of the tire into the hosing.

10. The tire pressure monitoring system as set forth in claim 8, wherein the housing includes:
    an accommodation groove formed in the housing so as to accommodate the protrusion portion of the valve antenna therein; and
    a coupling groove formed to face the coupling groove of the valve antenna,
    wherein the coupling member is coupled to the coupling grooves of the valve antenna and the housing so as to penetrate therethrough, thereby fixing and coupling the valve antenna and the housing to each other.

11. The tire pressure monitoring system as set forth in claim 8, wherein the conduction member has the other end divided into two portions so that the protrusion portion penetrates therethrough, and is electrically connected to the contact portion.

12. The tire pressure monitoring system as set forth in claim 11, wherein the conduction member includes an elastic piece that is formed between one end that is electrically connected to the electrical device unit and the other end that is electrically connected to the valve antenna.

13. The tire pressure monitoring system as set forth in claim 11, wherein the protrusion portion has a circular cross section.

14. The tire pressure monitoring system as set forth in claim 8, wherein the protrusion portion has any one of a semicircular cross section and a square cross section.

15. The tire pressure monitoring system as set forth in claim 1, wherein the valve antenna includes:
   a contact portion to which the conduction member is electrically connected;
   a protrusion portion protruding from the contact portion toward the housing; and
   a valve air path formed in the valve antenna so as to introduce the air pressure of the tire into the housing,
   wherein the protrusion portion has an outer circumference surface on which screw threads are formed and has a circular cross section.

16. The tire pressure monitoring system as set forth in claim 15, wherein the housing includes an accommodation groove accommodating the protrusion portion of the valve antenna therein, and
   wherein the accommodation groove has an inner circumference surface on which screw threads are formed such that the screw thread are coupled with the protrusion portion.

17. The tire pressure monitoring system as set forth in claim 9, wherein one end of the valve air path has an opening that is formed outside an outer circumference surface of the valve antenna and the other end of the valve air path is shaped like a hollow hole having an opening formed in an end portion of the valve antenna.

18. The tire pressure monitoring system as set forth in claim 17, wherein the valve air path has a "⌐" shaped cross section.

19. The tire pressure monitoring system as set forth in claim 1, wherein the valve antenna includes:
   a contact portion to which the conduction member is electrically connected;
   a protrusion portion protruding from the contact portion toward the housing;
   a valve air path shaped like a hollow hole having an opening that is formed in an upper portion of the protrusion portion so as to introduce the air pressure of the tire into the housing; and
   a pair of coupling grooves formed from an outer circumference surface of the valve antenna to an inner portion.

20. The tire pressure monitoring system as set forth in claim 19, wherein the housing includes:
   an accommodation groove accommodating the protrusion portion of the valve antenna therein;
   a coupling groove formed to face the coupling groove of the valve antenna; and
   a housing air path connected to the opening of the valve air path so as to introduce the air pressure of the tire into the housing,
   wherein the coupling member has the coupling groove penetrating therethrough so as to fix and couple the valve antenna and the housing to each other.

21. The tire pressure monitoring system as set forth in claim 1, wherein the valve antenna includes:
   a contact portion to which the conduction member is electrically connected;
   a protrusion portion protruding from the contact portion toward the housing;
   a coupling groove that is formed in an end portion of the protrusion portion and has the coupling member penetrating therethrough; and
   a valve air path that is formed in the valve antenna, having a predetermined interval from the coupling groove, to introduce the air pressure of the tire into the housing.

22. The tire pressure monitoring system as set forth in claim 21, wherein the housing includes a through hole that has an opening formed in an end portion of the housing so as to accommodate the protrusion portion of the valve antenna therein and to expose a portion of the protrusion portion to the outside of the housing.

23. The tire pressure monitoring system as set forth in claim 21, wherein the conduction member has the other end divided into two portions so that the protrusion portion penetrates therethrough, and is electrically connected to the contact portion.

24. The tire pressure monitoring system as set forth in claim 21, wherein the protrusion portion has a coupling groove formed in an end portion having the through hole of the housing penetrating therethrough and is exposed to the outside, and
   wherein the coupling member has the coupling groove penetrating therethrough so as to fix and couple the valve antenna and the housing to each other.

* * * * *